PHONOGRAPH

Filed Aug. 26, 1965 2 Sheets-Sheet 1

INVENTOR.
JOHN F. CASTAGNA
BY Philip S. Hilbert
ATTORNEY.

Sept. 19, 1967 J. F. CASTAGNA 3,342,497

PHONOGRAPH

Filed Aug. 26, 1965 2 Sheets-Sheet 2

INVENTOR.
JOHN F. CASTAGNA

BY Philip S. Hilbert

ATTORNEY.

United States Patent Office 3,342,497

Patented Sept. 19, 1967

3,342,497

PHONOGRAPH

John F. Castagna, Brooklyn, N.Y., assignor to Stelber Cycle Corporation, Elmhurst, N.Y.

Filed Aug. 26, 1965, Ser. No. 482,734
16 Claims. (Cl. 274—1)

This invention relates to a phonograph, and more particularly concerns a phonograph device having a novel speaker cone and stylus assembly.

An object of this invention is to provide an improved phonograph adapted to produce quality reproduction under adverse conditions of use, as in a vibratory environment incident to the location of such phonograph on a bicycle, on a boat, or the like.

A further object of this invention is to provide an improved phonograph in which the stylus arm is in a novel articulated relation to the speaker cone so as to provide high compliance whereby optimum tonal qualities are obtained and wear on the needle and record groove is minimized.

Still another object of this invention is to provide in a phonograph of the character described, a high compliance stylus arm which provides quality reproduction from records under adverse conditions including warped records, irregularities in the record groove, imperfections in the turntable or its operation, and the like.

Yet another object of this invention is to provide in a phonograph of the character described, a stylus construction which has combined rotary and sliding movements so as to permit lift of the stylus from the terminal end of a record groove, swing of the stylus to the start of a record groove and drop of the stylus to allow the needle thereon to engage in said groove, all in a single combined movement of the stylus.

Still a further object of this invention is to provide in a phonograph of the character described, a speaker cone and stylus arm mechanically related in a novel manner to optimize the movement of the stylus arm from its finish to start positions relative to a record, yet having a coupling therebetween which provides improved reproduced tonal qualities through a highly compliant operation of the stylus arm, which increases the normal life of the record.

Yet a further object of this invention is to provide in a phonograph of the character described, a stylus arm having a high compliance factor operative to maintain the speed of the motor rotating the turntable carrying a record, despite counterforces applicable to the stylus arm as an incident to record irregularities, and the like, permitting the use of motors of minimum size and power.

Still another object of this invention is to provide in a phonograph of the character described, a speaker cone having a sleeve portion in which a stylus arm is coupled to have combined rotary and sliding movement, together with means for damping the cone at its coupling point whereby to provide frequency control and lateral constraint of the speaker cone while allowing for vertical movement of the speaker cone, the damping means being variable as to shape and mass to thereby adjust the resonant frequency of the speaker cone.

Yet another object of this invention is to provide in a phonograph of the character described, having a highly compliant stylus, readily movable in a vertical plane to assure optimum engagement of the needle thereon in the record groove despite adverse operating conditions, together with resilient means for maintaining the needle in the record groove under varying operating conditions, yet with minimum resistance to the motor torque for turning the turntable carrying the record.

Still a further object of this invention is to provide in a phonograph of the character described having a high compliance tone arm with spring means for maintaining the needle on the arm in optimum engagement with a record groove, together with resilient means interposed between the spring means and the tone arm to mechanically insulate the reaction of the needle from the spring means, and thus optimizing the reproducing qualities over a broad range of frequencies and particularly in the high frequency range.

Still another object of this invention is to provide an improved phonograph of the character described, in which the tone arm is formed of molded plastic having minimized bulk and mass to thereby provide a low moment of inertia therein so that the needle in the tone arm will move in the record groove in an efficient manner despite use of the phonograph under adverse conditions of mechanical vibration as when the same is located on a bicycle, motor vehicle, boat, and the like.

Yet another object of this invention is to provide a phonograph in which a major portion of the components thereof are formed of molded plastic so as to materially reduce production costs thereof, yet providing a device affording excellent reproducing qualities.

Other objects of this invention will in part be obvious and in part hereinafter pointed out.

In the drawings, FIG. 1 is an exploded, partial, perspective view of a phonograph device embodying the invention;

Figures 1, 2:
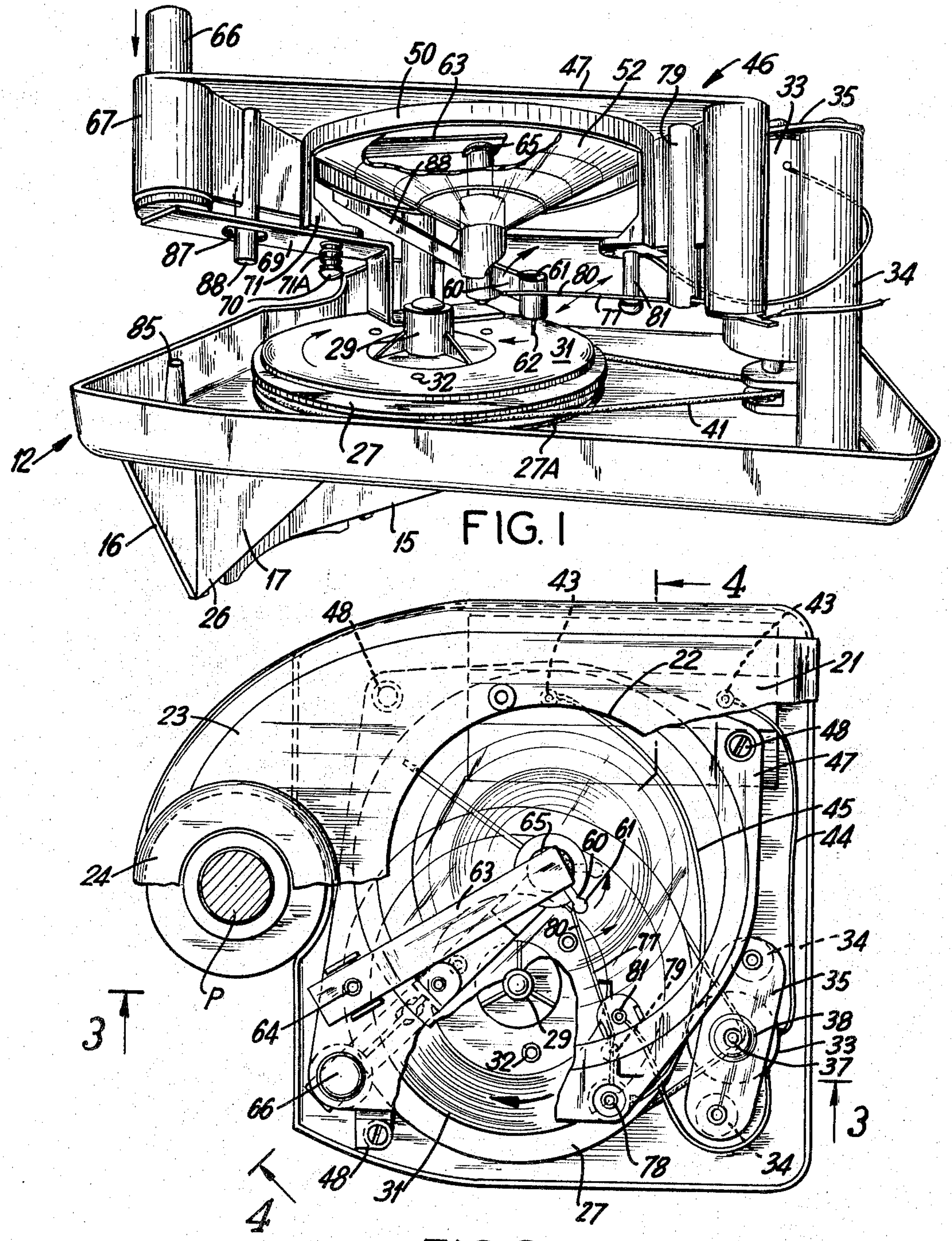
FIG. 2 is a top plan view of the device with parts broken away.
Figure 3:
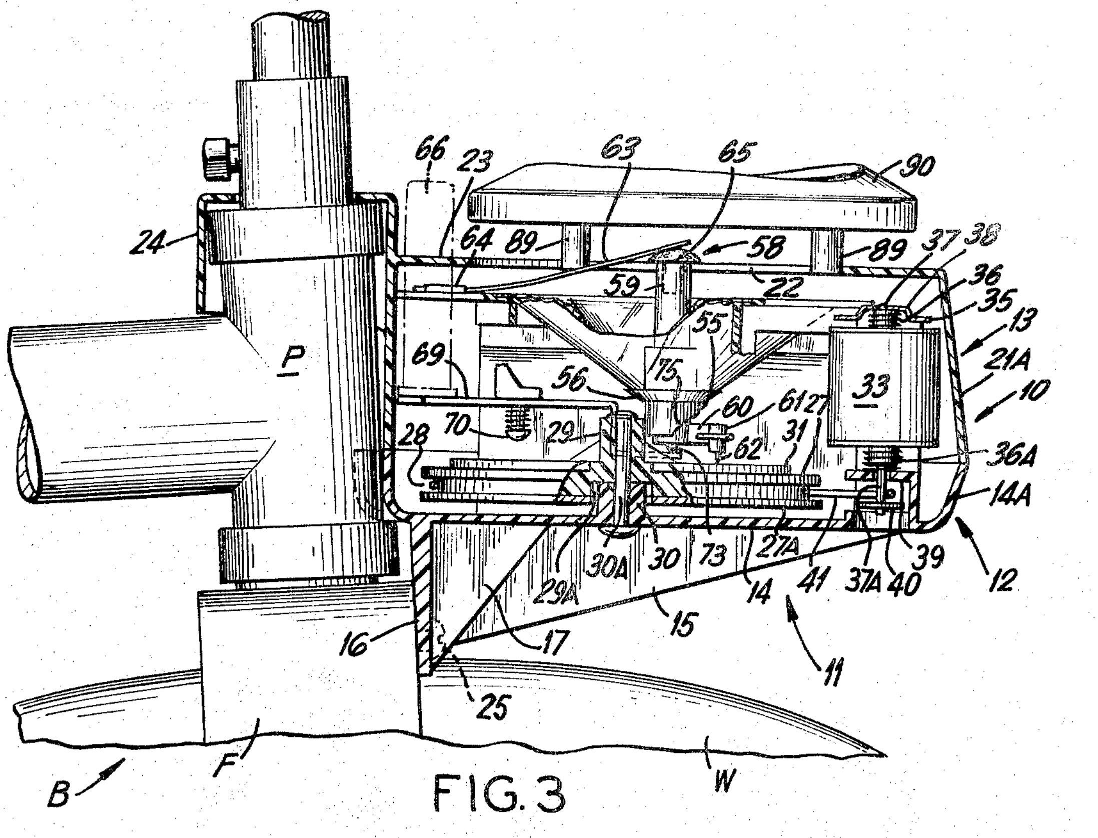
FIG. 3 is a sectional view taken on the line 3—3 of FIG. 2.
Figures 4, 5:
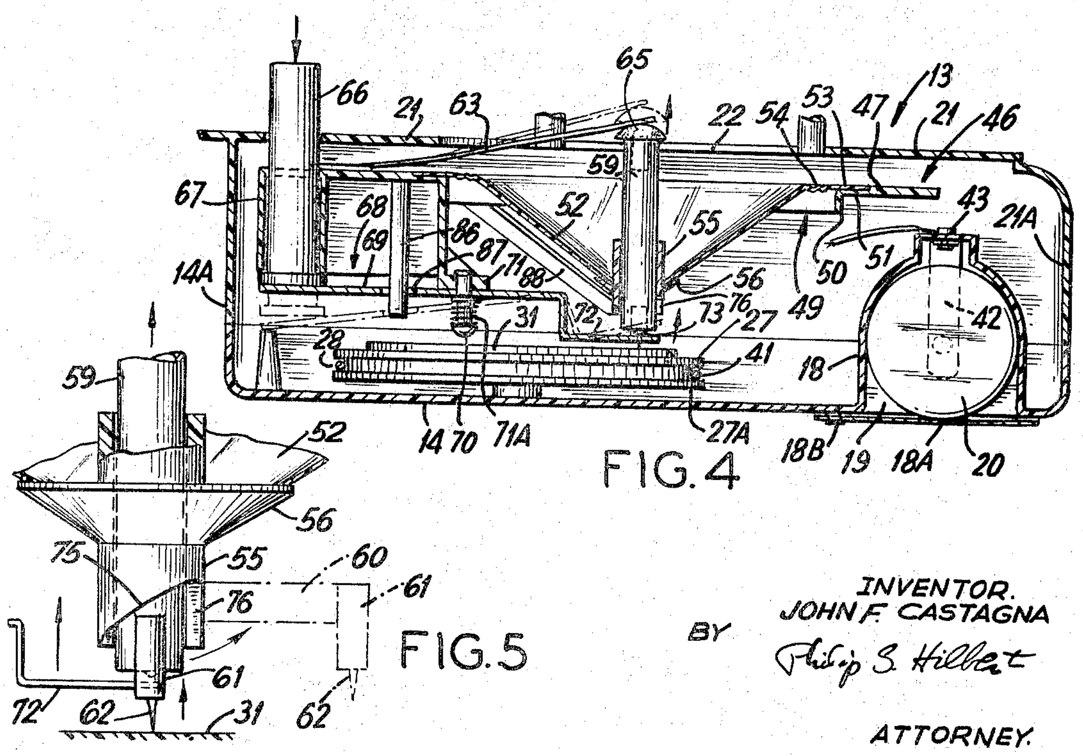
FIG. 4 is a sectional view taken on the line 4—4 of FIG. 2.
FIG. 5 is a partial elevational view of the stylus assembly with parts in section.

The device of the instant invention comprises essentially a phonograph device made up of a minimum number of simple components, organized in a novel manner to operate under adverse conditions and with hard usage, yet providing reproductions of reasonable quality; such device being particularly adapted for association with children's toys such as bicycles or the like.

Thus, as shown in the drawings, 10 designates a phonograph device embodying the invention; the same being enclosed in a molded plastic casing 11 having a lower pan portion and an upper cover portion 13. Such casing portions are made of a suitable molded resin such as polystyrene, polypropylene or the like, and are held together by screws or other fastening means, not shown.

The pan portion 12 comprises a bottom wall 14 having an upstanding peripheral rim 14A, a triangular shaped stiffening rib 15 extending from the bottom surface of wall 14, a transverse mounting flange 16 extending at right angles to rib 15 and connecting said rib 15 and bottom wall 14. A pair of parallel stiffening ribs 17 of small triangular shape and disposed on opposite sides of rib 15, also connect mounting flange 16 with bottom wall 14.

The bottom wall 14 of casing portion 12 is formed with an integral molded semicylindrical wall portion 18 upstanding from wall 14 and forming a semicylindrical recess 19 to removably receive therein a single dry cell 20, for the purpose hereinafter appearing. A latch member 18A pivoted at 18B spans recess 19 to retain cell 20 in place.

The casing cover 13 comprises a top wall 21 with a peripheral depending flange portion 21A whose lower edge is adapted to abut top edge of rim 14A of pan portion 12. The top wall 21 is formed with a central opening 22 for the purpose hereinafter appearing and includes a laterally projecting attachment portion 23 formed with an annular collar portion 24.

The device 10 is adapted to be mounted on children's toys of mobile or immobile form, as for example a bicycle generally indicated at B. Device 10 is mounted on post P of bicycle B, said post passing through collar 24 to locate device 10 in forwardly projecting relation to said post P and immediately above the front wheel guard W of bicycle B. The pan portion 12 of casing 11 is then secured in placed on the bicycle fork F by screws 25 passing through bottom opening slots 26 in mounting flange 16 and threaded into suitable openings in the forward edge of fork F.

Record reproducing means is sealed within casing 11, and such means comprises a molded plastic turntable disc 27 having a rabetted peripheral edge, with a circular metal plate 27A riveted to the underside thereof, providing a belt receiving groove 28. Disc 27 is formed with an upstanding hub 29 and a central, circular recess 29A on the underside thereof for rotatably seating said disc on an upstanding boss 30 on wall 14; a rivet type spindle 30A passing through hub 29 and boss 30. A molded plastic record disc 31 is fixed to turntable disc 27 by rivets 32; such record being of the type carrying a plurality of different recordings in spirally interleaved relation, so that each recording commences at the outer periphery of the disc 31 and at different points along the circumferential extent thereof.

The turntable 27 is driven by a miniature electric motor 33 vertically located between a pair of post members 34 upstanding from and integral with casing wall 14; a cross member 35 being secured to the tops of said post members 34. Spring means 36 about the upper shaft portion 37 is received in a cupped portion 38 of member 35, while the lower shaft portion 37A is journalled in a bearing portion 39 upstanding from and integral with bottom wall 14; spring means 36A being mounted between bearing portion 39 and the lower end of motor 33; to resiliently mount said motor 33 on casing portion 12.

A disc 40 fixed to the lower end of shaft portion 37A allows a rubber band driving belt 41 to be held in engagement with said shaft portion 37A and to be entrained in turntable groove 28, to permit motor 33 when energized, to drive turntable 27.

Motor 33 is energized by dry cell 20, through right angle contact clips 42 disposed within recess 19 at the opposite ends thereof to make resilient contact with the opposite, terminal ends of dry cell 20. Clips 42 are secured in place by rivets 43 on the top of wall portion 18, which rivets 43 also serve as electrical connecting means for electrical leads 44, 45. Lead 44 extends to one of the terminal connections on motor 33, while lead 45 is connected to suitable switch means, as hereinafter described.

A speaker and stylus assembly is provided for reproducing the individual recordings carried by record disc 31. To this end, there is provided a molded plastic speaker cone mounting plate 46 having a wall 47 disposed in raised relation to turntable 27 and fixed in position by screws 48 received in post portions, not shown, which are integral with and upstanding from casing wall 14.

Wall 47 is formed with a central opening 49 defined by a depending annular flange portion 50 and an annular recess 51 molded in the top surface of wall 47 about opening 49. A molded plastic cone speaker 52 has its base rim portion 53 received and cemented in recess 51 of wall 47, annular corrugations 54 being molded into the speaker cone. A stylus receiving bushing 55 of molded plastic is fixed in a vertical position to the apex portion of cone 52, bushing 55 having a conical, radially extending collar portion 56 for receiving the cone apex portion which is cemented thereto. Bushing 55 is formed with a downwardly opening cam groove 57 on the bottom edge thereof, for the purpose hereinafter appearing.

Stylus means is slidably and rotatably mounted in bushing 55, said means 58 comprising a molded plastic tubular member 59 having its upper end projecting above the upper end of bushing 55 and its lower end provided with a radially extending integral stylus arm 60 with a molded stud 61 at the outer end thereof for fixing therein a phonograph needle 62. Member 59 is resiliently biased downwardly by a leaf spring 63 anchored at one end to wall 47 by a rivet 64, the free outer end of said spring 63 bearing against the upper end of member 59, with an interposed soft rubber pad member 65 fixed in member 59 at the upper end thereof and abutting the outer end of member 63.

Control means is provided for initiating the rotation of turntable 27 and simultaneously and automatically locating needle 62 at the outer periphery of record disc 31; such control means being accessible from the exterior of casing 11. To this end, a starting pin 66 of molded plastic is loosely journalled in a vertical position in a bearing portion 67 integral with and depending from wall 47 at a corner portion thereof.

The flattened lower portion 66A of starting pin 66 overlies the outer end of an S-shaped lever member 68 and abuts the long arm portion 69 thereof. Lever member 68 is pivotally mounted on a rivet 70 depending from a boss portion 71 integral with flange portion 50 of wall 47, with a resilient bias provided by spring means 71A on rivet 70 and bearing against the pivot portion of lever arm 69. The short arm portion 72 of lever member 68, which is downwardly offset relative to lever arm portion 69, is disposed immediately beneath the lower end of stylus member 59 and adapted to engage an abutment portion 73 on the lower end of member 59 when starting pin 66 is manually depressed.

In normal operation of device 10, the needle 62 will be at the innermost groove of a recording on disc 31 when the stylus member 59 is at rest. In this position of stylus member 59, arm 60 will be located within cam groove 57 of bushing 55. Cam groove 57 is defined by an upwardly inclined edge 75 extending toward collar 56 and a vertical edge 76 extending from the top of edge 75 to the bottom of bushing member 55. In the rest position of device 10, the upper edge of stylus arm 60 will abut a lower portion of cam edge 75.

When starting pin 66 is manually depressed, lever member 68 is pivoted to bring short arm portion 72 thereof into engagement with abutment portion 73 of stylus member 59 and to raise member 59 and simultaneously rotate the same in a counterclockwise direction, looking at FIG. 2, thereby shifting stylus arm 60 to the position shown in dotted lines in FIG. 2, to locate needle 62 at the outer periphery of disc 31. Release of starting pin 66 allows the needle 62 to come into operative engagement with the particular recording on disc 31.

As starting pin 66 is depressed, switch means is operated to close the circuit to motor 33 to energize the same. To this end such switch means comprises a spring wire contact 77 connected at one end to lead 45 at a common point 78 such as a rivet connector mounted on a post portion depending from wall 47. The wire contact 77 extends through a grooved post portion 79 depending from wall 47 and the free end thereof 80 is located in contact with stud 61 of stylus arm 60 when stylus member 59 is in its rest position.

With spring wire contact 77 in said rest position, the same is slightly spaced from a fixed contact 81 mounted in depending relation from a boss portion 82 on wall 47; contact 81 being connected to the other terminal of motor 33 by a lead 83. It will be apparent, that when starting pin 66 is depressed, as previously described, stylus arm 60 swings in a direction to turn stud 61 away from the free end 80 of contact wire 77 and the bias of said wire is sufficient to make the same contact and engage fixed contact 81, thereby closing the circuit between motor 33 and dry cell 20 to energize the same.

Thus, motor 33 remains energized until stylus member 59 reaches its innermost position at the end of the particular recording on disc 31, as indicated in solid lines in FIG. 2, at which time stud 61 on arm 60 reengages the free end 80 of wire contact 77 and to move the same a slight distance to separate the same from fixed contact 81 and thereby open the circuit to motor 33 and to de-energize the same simultaneously with the completion of the playing of the particular recording on disc 31.

Stop means for limiting the depressed movement of starting pin 66 is provided by an upstanding stud portion 85 on casing wall 14. Also, lever member 68 is retained against lateral movement by a pin portion 86 depending from wall 47 and passing through an opening 87 in lever arm portion 69. Bushing member 55 is maintained in its position by a strut 88 extending radially from said member 55 to flange portion 50 on wall 47; thus keeping the speaker cone 52 from moving laterally, yet permitting vertical movement. The strut 88 may be varied as to its mass and cross section, to thereby adjust the damping effect of the same and thus control the resonant frequency of the speaker.

The stylus member 59 is acoustically coupled to bushing 55 of speaker member 52 through a viscous coating of silicone grease applied to the opposed surfaces thereof, thereby making the stylus means 58 highly compliant in respect to its vertical movements when the needle 62 thereon traverse the grooves in record disc 31 and also lubricating such movements as well as the rotary movements thereof when the needle 62 is lifted and swung to its starting position.

Device 10 lends itself to attachment to bicycles in which case the casing 11 may have associated therewith molded plastic figures. Accordingly, tubular portions 89 integral with wall 21 of casing member 13 and located at the periphery of opening 22 therein, provide means for attaching a molded plastic figure generally indicated at 90, to casing 11. Thus, the reproduction of the recordings from disc 31 via speaker cone 52, will appear to emanate from the figure 90, which may be that of the head of a person, entertainer, animal or the like.

It will be apparent that device 10, although made essentially of molded plastic parts, is still capable of providing acoustic reproductions of good quality, to operate under adverse conditions of mechanical vibration as when mounted on a bicycle, vehicle, boat or the like; yet having an extended normal life without damaging the record mounted in the device. Further, the speed of motor 33 will be maintained fairly constant despite resistive forces set up in the record because of warpage or the like.

As various changes might be made in the embodiment of the invention herein disclosed without departing from the spirit thereof, it is understood that all matter herein shown or described shall be deemed illustrative and not by way of limitation except as set forth in the appended claims.

What is claimed is:

1. A phonograph device comprising sound reproducing means including speaker means and stylus means movably connected to said speaker means, manual control means for imparting movement to said stylus means relative to said speaker means, and coacting means on said speaker means and said stylus means for simultaneously moving said stylus in a vertical plane while rotating said stylus.

2. A phonograph device as in claim 1 wherein said speaker means includes a bushing member and said stylus means comprises a member rotatably and slidably mounted in said bushing member, said coacting means including a cam groove formed in a wall portion of said bushing and a tone arm extending radially from said stylus member and movable in said cam groove.

3. A phonograph device as in claim 2 and further including means for acoustically coupling said stylus member with said speaker bushing member, said coupling means comprising silicone grease interposed between opposed surface portions of said stylus member and bushing member.

4. A phonograph device as in claim 2 and further including a member extending from said bushing member to a rim portion of said speaker means to constrain said speaker bushing member against lateral movement.

5. A phonograph device comprising a casing, said casing having a bottom wall, turntable means rotatably mounted on said bottom wall, electric motor means connected to said turntable means for rotating said turntable, switch means for controlling said motor means, means for mounting a cone speaker with the apex portion thereof in a vertical depending position over said turntable means, bushing means fixed in the apex portion of said cone speaker, stylus means comprising a stylus member slidably and rotatably mounted in said bushing means, said stylus means including a tone arm extending radially from the lower end of said stylus member, a record on said turntable, needle means on the outer end of said tone arm for engaging a groove in said record, means for resiliently biasing said stylus member downwardly toward said record, lever means on said casing for actuating said stylus member to impart movement thereto, cam groove means on said bushing means, said tone arm being disposed within said cam groove whereby movement of said stylus member is effective to move said tone arm upwardly and simultaneously swing said arm from a position wherein said needle means is at the end of the groove in said record to a position wherein said needle means is at the beginning of said groove, said stylus means being opertaive to control the operation of said switch means in response to the swinging movement thereof.

6. A phonograph device as in claim 5 and further including resilient damping means interposed between said stylus member and said biasing means.

7. A phonograph device comprising a casing, a record turntable, means on said casing for mounting said turntable for rotation, means for rotating said turntable, record means on said turntable, a speaker cone, means for mounting said speaker cone with the apex portion thereof extending downwardly toward said turntable, a bushing on said apex portion of the speaker cone, a stylus member slidably and rotatably mounted in said bushing, said stylus member having opposite end portions respectively projecting beyond the opposite ends of said bushing, tone arm means extending radially from the lower end of said stylus member, needle means fixed in the outer end of said tone arm, resilient means engageable with the upper end of said stylus member for biasing said stylus member downwardly to bring said needle means into engagement with a groove portion on said record means, movable means having a portion thereof engageable with the lower end of said stylus means for lifting said stylus means upwardly, coacting means on said bushing and said stylus means operative to rotate said stylus means in response to the lifted movement of said stylus means, means for controlling said turntable rotating means, said controlling means being engageable by said tone arm during the rotary movement of said stylus means for actuating said controlling means.

8. A phonograph device comprising a casing, means within said casing for carrying a rotatable grooved record, electric motor means for rotating said first means, sound reproducing means within said casing comprising cone speaker means, sleeve means on said speaker means, stylus means slidably and rotatably mounted in said sleeve means, cam means on said sleeve means for rotating said stylus means in response to raised movement of said stylus means, means for raising said stylus means, switch means in circuit with said motor means and including a movable contact engageable by said stylus means, and a fixed contact, said movable contact being normally spaced from said fixed contact, said movable contact moving to a fixed contact engaging position in response to movement of said stylus means to its starting position.

9. A phonograph device as in claim 8 wherein said casing includes a lower pan portion and an upper cover portion, said cone speaker means being located in raised relation to said lower casing portion, said lower casing portion being formed with a recess, dry cell means in said recess for energizing said motor means, said upper cover portion being formed with an opening in substantial alignment with said cone speaker means.

10. A phonograph device comprising a base member, a record turntable, means on said base member for mounting said turntable for rotation, means for rotating said turntable, record means on said turntable, a molded plastic speaker cone, means on said base member for mounting said speaker cone with the apex portion thereof extending downwardly toward said turntable, a plastic bushing member fixed in the apex portion of said speaker cone, a molded plastic stylus member, said stylus member including a portion slidably and rotatably mounted in said bushing member, a tone arm portion extending radially from the lower end of said slidable portion and needle means fixed in the outer end of said tone arm portion, said bushing member having a cam groove formed in a wall portion thereof, the inner end of said tone arm portion projecting through said cam groove and having a portion thereof engageable with a cam edge of said cam groove, resilient means for biasing said stylus member in a downward direction, means for lifting said stylus member upwardly against the bias of said resilient means, said cam groove being operative to rotate said stylus member in response to the lifted movement thereof whereby to shift said needle means from a rest position thereof in engagement with the inner end of a groove on said record means to a starting position thereof in engagement with the outer end of a groove in said record means, said biasing means being operative to maintain said needle means in the groove of said record means under adverse conditions of usage.

11. A phonograph device as in claim 10 wherein said stylus member is of minimized weight and bulk.

12. A phonograph device as in claim 10 wherein said stylus lifting means comprises a lever arm, means on said base member for pivotally mounting said lever arm, and means on said base member for actuating said lever arm.

13. A phonograph device as in claim 10 and further including elongated means extending between said speaker cone mounting means and said bushing member for constraining said bushing member against lateral movement.

14. A phonograph device as in claim 13 wherein said elongated means extends from a wall portion of said bushing means in diametrically aligned relation to the cam groove therein.

15. A phonograph device as in claim 10 and further including silicone grease on the opposed surface portions of said bushing member and the slidable and rotatable portion of said stylus member.

16. A phonograph device as in claim 10 and further including resilient damping means between the upper end of the slidable and rotatable stylus portion and said resilient biasing means.

References Cited

UNITED STATES PATENTS

| | | | |
|---|---|---|---|
| 2,063,578 | 12/1936 | Berglund | 274—1.1 X |
| 2,552,757 | 5/1951 | Adler et al. | 274—14 X |
| 2,639,924 | 5/1953 | Bush | 274—15 |
| 3,287,020 | 11/1966 | Beebe | 274—1.1 X |

LEONARD FORMAN, *Primary Examiner.*

L. ANDERSON, *Examiner.*